Patented Aug. 4, 1953

2,647,905

UNITED STATES PATENT OFFICE 2,647,905

PREPARATION OF 2 - SUBSTITUTED - 3-UREIDO-4-THIAZOLIDONES, 1-DIOXIDE DERIVATIVES THEREOF

Alexander R. Surrey, Albany, N. Y., assignor to Sterling Drug Inc., New York, N. Y., a corporation of Delaware No Drawing. Application September 5, 1951, Serial No. 245,251

13 Claims. (Cl. 260—301)

This invention relates to 2-substituted-3-ureido-4-thiazolidones, to 1-dioxide derivatives thereof and to processes of preparing these compounds.

The compounds of my invention have the formula

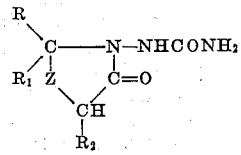

where R is an aryl radical or a lower alkyl radical, $R_1$ is hydrogen or a lower alkyl radical when R is a lower alkyl radical, $R_2$ is hydrogen or a lower alkyl radical and Z is S or $SO_2$.

The compounds of my invention are useful as intermediates in the preparation of pharmaceuticals and other organic compounds; also, some of the compounds have antibacterial activity.

In the above general formula, R, $R_1$ and $R_2$ when representing a lower alkyl radical have preferably from one to six carbon atoms, including radicals such as methyl, ethyl, n-propyl, n-butyl, isobutyl, 2-butyl, isoamyl, n-hexyl, 3-hexyl, and the like. R, when representing an aryl radical, comprehends preferably those having 1-2 rings, including substituted and unsubstituted phenyl, naphthyl and biphenylyl radicals. Such aryl radicals include the unsubstituted radicals such as phenyl, 1-naphthyl, 2-naphthyl, 2-biphenylyl, 3-biphenylyl and 4-biphenylyl; alkoxyaryl radicals such as 3-ethoxyphenyl, 3,4-dimethoxyphenyl, 3-ethoxy-4-methoxyphenyl, 3,4-methylenedioxyphenyl, 3,4,5-trimethoxyphenyl, 4-n-butoxyphenyl, 3-methoxy-4-hydroxyphenyl, and the like; nitroaryl radicals such as 3-nitrophenyl, 4-nitrophenyl, 4-nitro-1-naphthyl, 3,5-dinitrophenyl, and the like; carbalkoxyaryl radicals such as 3-carbethoxyphenyl, 4-carbo-methoxyphenyl, 4-carbo-n-butoxyphenyl, and the like; alkylaryl radicals such as para-tolyl, 3-ethylphenyl, 4-methyl-1-naphthyl, 4-isobutylphenyl, and the like; aminoaryl radicals such as 4-aminophenyl, 4-acetylaminophenyl, 4-n-butylaminophenyl, 4-dimethylaminophenyl, 3-ethylaminophenyl, 4-n-propylamino-1-naphthyl, and the like; haloaryl radicals such as 4-chlorophenyl, 3,4-dichlorophenyl, 3,5-dibromophenyl, 4-chloro-1-naphthyl, 3-bromo-1-naphthyl, and the like; carboxyaryl radicals such as 4-carboxyphenyl, and the like; and related radicals. A preferred class of R for my invention consists of the unsubstituted phenyl radical and phenyl radicals substituted by from one to three substituents such as those illustrated above. Furthermore, said substituents can be in any of the available positions of the phenyl nucleus, and where more than one, can be the same or different and can be in any of the various position combinations relative to each other. This preferred class of aryl radicals including the unsubstituted phenyl and substituted-phenyl radicals can be designated as monocarbocyclic aryl radicals.

The compounds of my invention where Z is S are prepared by reacting a semicarbazone having the formula, $RR_1CH=N-NHCONH_2$, where R and $R_1$ have the same meanings defined hereinabove, with a 2-mercaptoalkanoic acid.

The procedure I prefer in practicing my invention is to carry out the reaction by heating said semicarbazone with thioglycolic acid at a temperature in the range of 80–150° C. in a refluxing solution of a non-polar solvent such as benzene, toluene or a petroleum ether fraction, with a continuous separator connected to the reaction flask. (See illustrations on pages 262 and 422, "Organic Synthesis," Collective Volume I, 2nd Ed., New York, 1941.) The water which forms during the reaction is collected as a distinct layer in the separator. Heating is discontinued when no further separation of water is noted. In most instances, the amount of water collected approaches the theoretical quantity necessary for completion of the reaction. Alternatively, the reaction can be run in the absence of a solvent or in the presence of other inert solvents. The reaction can be run in the presence of a minor quantity of an acidic condensing agent, such as para-toluenesulfonic acid, which, in some instances, tends to accelerate the reaction. In a typical example of the above general procedure, using as the semicarbazone, methyl ethyl ketone semicarbazone, the resulting product is 1-ethyl-1-methyl-3-ureido-4-thiazolidone having the formula

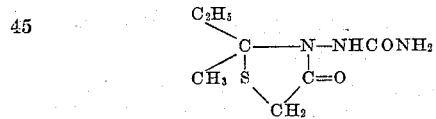

In the above general procedure, other 2-mercaptoalkanoic acids can be substituted for thioglycolic acid. Thus, 2-(3-nitrophenyl)-3-ureido-5-ethyl-4-thiazolidone, 2,2 - diethyl - 3 - ureido-5-n-amyl-4-thiazolidone and 2-(3,4-dichlorophenyl)-3-ureido-5-methyl-4-thiazolidone are formed when the reactants are, respectively, 3-nitrobenzaldehyde semicarbazone and 2-mercaptobutanoic acid, diethyl ketone semicarbazone and 2-mercaptoheptanoic acid, and 3,4-dichlorobenzaldehyde semicarbazone and 2-mercaptopropanoic acid.

The 2-substituted-3-ureido-4-thiazolidones of my invention where the 2-substituent is an aryl radical substituted by an amino radical are readily prepared by reducing the corresponding nitroaryl compounds. For example, 2-(4-aminophenyl)-3-ureido-4-thiazolidone is formed by reducing 2-(4-nitrophenyl)-3-ureido-4-thiazolidone with a reducing agent such as iron and acetic acid or any appropriate reducing agent suitable for reducing nitro groups to amino groups.

The compounds of my invention where Z is $SO_2$ are conveniently prepared by oxidizing the corresponding thiazolidone (where Z is S). For example, 2-(3,5-dibromophenyl)-3-ureido-4-thiazolidone-1-dioxide is formed by oxidation of 2-(3,5-dibromophenyl)-3-ureido-4-thiazolidone. Useful oxidizing agents in the reaction include potassium permanganate, hydrogen peroxide, chromium trioxide ($CrO_3$), and the like.

The following examples will further illustrate specific embodiments of the invention.

EXAMPLE 1

2-(4-chlorophenyl)-3-ureido-4-thiazolidone

A mixture of 30 g. of 4-chlorobenzaldehyde semicarbazone, 60 cc. of 95% thioglycolic acid, 1.5 g. of para-toluenesulfonic acid monohydrate and 300 cc. of benzene was refluxed with stirring for twenty-four hours, with a continuous separator connected to the reaction flask. About 5 cc. of water was collected in this time. The reaction mixture was cooled and stirred with a large excess of 10% sodium bicarbonate solution. The white solid which separated was collected, triturated with ether and dried; 28 g., M. P. 204–206°. This product, 2-(4-chlorophenyl)-3-ureido-4-thiazolidone, melted at 212–213.5° C. (cor.) when recrystallized from ethanol.

Anal.: Calcd. for $C_{10}H_{10}ClN_3O_2S$: N, 15.47; S, 11.79. Found: N, 15.21; S, 11.98.

Other 2-aryl-3-ureido-4-thiazolidones that can be prepared by following the directions of the above example using the appropriate aldehyde semicarbazone in place of 4-chlorobenzaldehyde semicarbazone include the following: 2-(3,4-dichlorophenyl)-3-ureido-4-thiazolidone; 2-(3,5-dibromophenyl)-3-ureido-4-thiazolidone; 2-(4-iodophenyl)-3-ureido-4-thiazolidone; 2-(4-carbomethoxyphenyl)-3-ureido-4-thiazolidone; 2-(4-carboxyphenyl)-3-ureido-4-thiazolidone; 2-(4-chloro-1-naphthyl)-3-ureido-4-thiazolidone; 2-(3-bromo-1-naphthyl)-3-ureido-4-thiazolidone; and the like.

EXAMPLE 2

2-(4-chlorophenyl)-3-ureido-4-thiazolidone-1-dioxide

To 9 g. of 2-(4-chlorophenyl)-3-ureido-4-thiazolidone in 100 cc. of acetic acid was added 10.3 g. of potassium permanganate in 150 cc. of water, keeping the temperature at about 30–40° C. The reaction mixture was treated with sodium bisulfite solution and the brown product was collected. Recrystallization from a large volume of water gave 5 g. of 2-(4-chlorophenyl)-3-ureido-4-thiazolidone-1-dioxide, melting at 220–221° C. (cor.).

Anal.: Calcd. for $C_{10}H_{10}N_3O_4ClS$: N, 13.34; S, 10.52. Found: N, 13.71; S, 10.65.

Other 2-aryl-3-ureido-4-thiazolidone-1-dioxides that can be prepared according to the above procedure by using the appropriate 2-aryl-3-ureido-4-thiazolidone in place of 2-(4-chlorophenyl)-3-ureido-4-thiazolidone include the following: 2-(3,4-dichlorophenyl)-3-ureido-4-thiazolidone-1-dioxide; 2-(3,5-dibromophenyl)-3-ureido-4-thiazolidone-1-dioxide; 2-(4-iodophenyl)-3-ureido-4-thiazolidone-1-dioxide; 2-(4-carbomethoxyphenyl)-3-ureido-4-thiazolidone-1-dioxide; 2-(4-carboxyphenyl)-3-ureido-4-thiazolidone-1-dioxide; 2-(4-chloro-1-naphthyl)-3-ureido-4-thiazolidone-1-dioxide; 2-(3-bromo-1-naphthyl)-3-ureido-4-thiazolidone-1-dioxide; and the like.

EXAMPLE 3

2,2-dimethyl-3-ureido-4-thiazolidone

A mixture of 22.8 g. of acetone semicarbazone, 40 g. of thioglycolic acid and 175 cc. of benzene was refluxed with stirring for eight hours, 40 g. more of thioglycolic acid was added, and refluxing was continued for an additional sixteen hours. The reaction mixture was filtered, cooled, and ether added. After standing for three days, 12 g. of impure product was collected. After two recrystallizations from water, 5.5 g. of 2,2-dimethyl-3-ureido-4-thiazolidone, melting at 187.6–189.2° C. (cor.), was obtained.

Anal.: Calcd. for $C_6H_{11}N_3O_2S$: N, 22.22; S, 16.95. Found: N, 22.05; S, 16.99.

When the foregoing procedure is followed but using diethyl ketone semicarbazone or methyl n-butyl ketone semicarbazone in place of acetone semicarbazone, there is obtained, respectively, 2,2-diethyl-3-ureido-4-thiazolidone or 2-methyl-2-n-butyl-3-ureido-4-thiazolidone.

EXAMPLE 4

2,2-dimethyl-3-ureido-4-thiazolidone-1-dioxide

To 9 g. of 2,2-dimethyl-3-ureido-4-thiazolidone in 25 cc. of acetic acid at 25–30° C. was added with stirring a solution of 15.8 g. of potassium permanganate in 250 cc. of water. Stirring was then continued for one additional hour and the reaction mixture was treated with sodium bisulfite solution. After refrigeration for twenty-four hours, 2.2 g. of product was collected. Concentration of the filtrate gave an additional 3.8 g. After two recrystallizations from water the product, 2,2-dimethyl-3-ureido-4-thiazolidone-1-dioxide, melted at 202–202.7° C. (cor.).

Anal.: Calcd. for $C_6H_{11}N_3O_4S$: N, 19.00; S, 14.50. Found: N, 19.10; S, 14.62.

When the foregoing procedure is followed but using, in place of 2,2-dimethyl-3-ureido-4-thiazolidone, 2,2-diethyl-3-ureido-4-thiazolidone or 2-methyl-2-n-butyl-3-ureido-4-thiazolidone, there is obtained, respectively, 2,2-diethyl-3-ureido-4-thiazolidone-1-dioxide or 2-methyl-2-n-butyl-3-ureido-4-thiazolidone-1-dioxide.

EXAMPLE 5

2-n-propyl-3-ureido-4-thiazolidone

A mixture of 12 g. of n-butyraldehyde semicarbazone, 20 g. of thioglycolic acid and 100 cc. of benzene was refluxed with stirring for eighteen hours with a continuous separator connected to the reaction vessel. Two cc. of water was collected. After cooling, a small amount of solid was removed by filtration. The filtrate was stirred with 10% aqueous sodium carbonate solution and cooled in ice. The solid which separated was collected and recrystallized twice from water, yielding the desired product, 2-n-propyl-3-ureido-4-thiazolidone, M. P. 159.1–160.3° C. (cor.).

Anal.: Calcd. for $C_7H_{13}N_3O_2S$: N, 20.68: S. 15.77. Found: N, 20.57; S. 15.68.

When the foregoing procedure is followed but using in place of n-butyraldehyde semicarbazone, acetaldehyde semicarbazone, n-propionaldehyde semicarbazone or n-heptaldehyde semicarbazone, there is obtained, respectively, 2-methyl-3-ureido-4-thiazolidone, 2-ethyl-3-ureido-4-thiazolidone, 2-ethyl-3-ureido-4-thiazolidone or 2-n-hexyl-3-ureido-4-thiazolidone.

Treatment of 2-n-propyl-3-ureido-4-thiazolidone, 2-methyl-3-ureido-4-thiazolidone, 2-ethyl-3-ureido-4-thiazolidone or 2-n-hexyl-3-ureido-4-thiazolidone according to the directions given above in Example 4 yield, respectively, 2-n-propyl - 3 - ureido - 4 - thiazolidone-1-dioxide, 2 - methyl-3-ureido-4-thiazolidone - 1 - dioxide, 2 - ethyl-3-ureido-4-thiazolidone-1-dioxide or 2-n-hexyl-3-ureido-4-thiazolidone-1-dioxide.

EXAMPLE 6

2-(4-hydroxy-3-methoxyphenyl)-3-ureido-4-thiazolidone

A mixture of 21.7 g. of 4-hydroxy-3-methoxybenzaldehyde semicarbazone, 20 g. of thioglycolic acid and 150 cc. of benzene was refluxed with stirring for six hours with a continuous separator connected to the apparatus. Twenty grams more of thioglycolic acid was added and refluxing was continued for an additional sixteen hours. About 2 cc. of water was collected. The reaction mixture was filtered while hot; 16 g. of starting semicarbazone was recovered. The filtrate was cooled in ice to give 9 g. of crude product. Recrystallization from ethanol and then from water gave 3 g. of 2-(4-hydroxy-3-methoxyphenyl) - 3 - ureido-4-thiazolidone, M. P. 188.8–190° C. (cor.).

Anal.: Calcd. for $C_{11}H_{13}N_3O_4S$: N, 14.84; S, 11.31. Found: N, 14.84; S, 11.47.

When the above procedure is followed but using, in place of 4-hydroxy-3-methoxybenzaldehyde semicarbazone, 3,4-dihydroxybenzaldehyde semicarbazone, 3,4-methylenedioxybenzaldehyde semicarbazone, 3,4,5 - trimethoxybenzaldehyde semicarbazone, 4-ethoxybenzaldehyde semicarbazone, 2-methoxybenzaldehyde semicarbazone, 4-n-butoxybenzaldehyde semicarbazone or 4-methoxy-1-naphthaldehyde semicarbazone, there is obtained, respectively, 2-(3,4-dihydroxyphenyl)-3-ureido-4-thiazolidone, 2-(3,4-methylenedioxyphenyl)-3-ureido-4-thiazolidone, 2-(3,4,5-trimethoxyphenyl)-3-ureido-4-thiazolidone, 2-(4-ethoxyphenyl)-3-ureido-4-thiazolidone, 2-(2-methoxyphenyl)-3-ureido-4-thiazolidone, 2-(4-n-butoxyphenyl)-3-ureido-4-thiazolidone or 2-(4-methoxy-1-naphthyl)-3-ureido - 4 - thiazolidone.

Treatment of these compounds according to the procedure given above in Example 2 results in the formation of the corresponding 1-dioxides.

EXAMPLE 7

2-(4-methoxyphenyl)-3-ureido-4-thiazolidone

When the procedure described hereinabove for Example 1 was followed but using 19.3 g. of 4-methoxybenzaldehyde semicarbazone, 40 g. of thioglycolic acid, 200 cc. of benzene, 2 g. of paratoluenesulfonic acid and a reflux period of twenty-nine hours, there was obtained, after several recrystallizations from ethanol, 4 g. of 2-(3-methoxyphenyl)-3-ureido-4- thiazolidone, M. P. 192–193° C. (cor.).

Anal.: Calcd. for $C_{11}H_{13}N_3O_3S$: N, 15.72; S, 11.99. Found: N, 15.81; 11.81.

Oxidation of the foregoing compounds according to the procedure described above in Example 2 results in the formation of 2-(4-methoxyphenyl)-3-ureido-4-thiazolidone-1-dioxide.

EXAMPLE 8

2-(4-nitrophenyl)-3-ureido-4-thiazolidone

When the procedure described above for Example 1 was followed but using 12 g. of 4-nitrobenzaldehyde semicarbazone, 22.8 g. of thioglycolic acid, 150 cc. of benzene, 1 g. of para-toluenesulfonic acid and a reflux of thirteen hours, there was obtained, after two recrystallizations from ethanol, 4.5 g. of 2-(4-nitrophenyl)-3-ureido-4-thiazolidone, M. P. 190–191.8° C. (cor.).

Anal.: Calcd. for $C_{10}H_{10}N_4O_4S$: N, 19.86; S, 11.36. Found: N, 20.11; S, 11.56.

This preparation was also run in the absence of a solvent as follows: A mixture of 7 g. of p-nitrobenzaldehyde semicarbazone and 50 g. of thioglycolic acid was heated on the steam bath for twenty hours. The reaction mixture was poured into a large excess of 10% $Na_2CO_3$ solution and a small amount of solid was removed by filtration. On standing, about 5 g. of solid separated from the filtrate. Recrystallization of this solid from absolute ethanol gave 2 g. of 2-(4-nitrophenyl)-3-ureido-4-thiazolidone.

Following the above procedures but using, in place of 4-nitrobenzaldehyde semicarbazone, 3-nittrobenzaldehyde semicarbazone, 3,5-dinitrobenzaldehyde semicarbazone, 4-n-butylaminobenzaldehyde semicarbazone, 4-acetylaminobenzaldehyde semicarbazone, 4-dimethylaminobenzaldehyde semicarbazone or 4-nitro-1-naphthaldehyde semicarbazone, there is obtained respectively, 2-(3-nitrophenyl)-3-ureido-4-thiazolidone, 2-(3,5-dinitrophenyl)-3-ureido-4-thiazolidone, 2-(4-n-butylaminophenyl)-3-ureido-4-thiazolidone, 2-(4-acetylaminophenyl) - 3 - ureido-4-thiazolidone, 2-(4-dimethylaminophenyl)-3-ureido-4-thiazolidone or 2-(4-nitro-1-naphthyl)-3-ureido-4-thiazolidone.

Oxidation of these 4-thiazolidones according to the procedure described above in Example 2 results in the formation of the respective 4-thiazolidone-1-dioxides.

Treatment of the foregoing nitrophenyl or nitronaphthyl compounds with a reducing agent, such as iron and acetic acid, iron and hydrochloric acid, etc., results in the formation of the corresponding aminophenyl or aminonaphthyl compound. For instance, such treatment of 2-(4-(nitrophenyl)-3-ureido-4-thiazolidone yields 2-(4-aminophenyl)-3-ureido-4-thiazolidone.

EXAMPLE 9

2-phenyl-3-ureido-4-thiazolidone

When the procedure described hereinabove in Example 3 was followed but using 14.5 g. of benzaldehyde semicarbazone, 20 g. of thioglycolic acid, 125 cc. of benzene and a reflux period of thirty hours, there was obtained 2-phenyl-3-ureido-4-thiazolidone, M. P. 195.5–197.5° C. (cor.), when recrystallized from ethanol.

Anal.: Calcd. for $C_{19}H_{11}N_3O_2S$: N, 17.72; S, 13.50. Found: N, 17.97; S, 13.51.

Following the above procedure but using, in place of benzaldehyde semicarbazone, 4-methylbenzaldehyde semicarbazone, 3-ethylbenzaldehyde semicarbazone, 4-isobutylbenzaldehyde semicarbazone, 2-naphthaldehyde semicarbazone, 4-methyl-1-naphthaldehyde semicarbazone or 4-biphenylcarboxyaldehyde semicarbazone, there is obtained, respectively, 2-(4-methylphenyl)-3-ureido-4-thiazolidone, 2-(3-ethylphenyl)-3-ureido-4-thiazolidone, 2-(4-isobutylphenyl)-3-ureido-4-thiazolidone, 2-(2-naphthyl)-3-ureido-4-thiazolidone, 2-(4-methyl-1-naphthyl)-3-ureido-4-thiazolidone or 2-(4-biphenylyl)-3-ureido-4-thiazolidone.

Oxidation of these 4-thiazolidones according to the procedure described above in Example 2 results in the formation of the corresponding 4-thiazolidone-1-dioxides.

I claim:

1. The process of preparing a compound having the formula

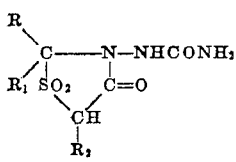

where R is a member of the group consisting of an aryl radical having 1-2 carbocyclic rings and a lower alkyl radical, $R_1$ is a member of the group consisting of hydrogen and a lower alkyl radical when R is lower alkyl, and $R_2$ is a member of the group consisting of hydrogen and a lower alkyl radical, which comprises the steps of (a) heating a semicarbazone of the formula $$RR_1C=NNHCONH_2$$

with a lower 2-mercaptoalkanoic acid to yield a 4-thiazolidone having the formula

and (b) oxidizing said 4-thiazolidone.

2. The process of preparing a compound having the formula

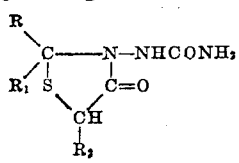

where R is a member of the group consisting of an aryl radical having 1-2 carbocyclic rings and a lower alkyl radical, $R_1$ is a member of the group consisting of hydrogen and a lower alkyl radical when R is lower alkyl and $R_2$ is a member of the group consisting of hydrogen and a lower alkyl radical, which comprises heating a semicarbazone of the formula $RR_1C=NNHCONH_2$ with a lower 2-mercaptoalkanoic acid.

3. The process of preparing a compound having the formula

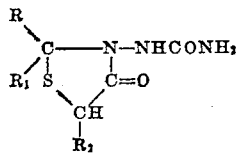

where R is a member of the group consisting of an aryl radical having 1-2 carbocyclic rings and a lower alkyl radical, $R_1$ is a member of the group consisting of hydrogen and lower alkyl radical when R is lower alkyl and $R_2$ is a member of the group consisting of hydrogen and a lower alkyl radical, which comprises oxidizing a 4-thiazolidone having the formula

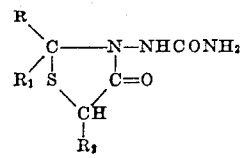

where R, $R_1$ and $R_2$ having the meanings designated hereinabove.

4. The process of preparing a compound having the formula

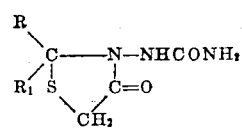

where R and $R_1$ are each lower alkyl radicals, which comprises heating a semicarbazone of the formula $RR_1C=NNHCONH_2$ with thioglycolic acid.

5. The process of preparing a compound having the formula

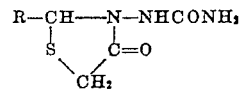

where R is a lower alkyl radical, which comprises heating a semicarbazone of the formula $$RCH=NNHCONH_2$$

with thioglycolic acid.

6. The process of preparing a compound having the formula

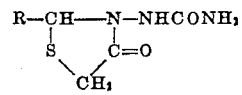

where R is a monocarbocyclic aryl radical, which comprises heating a semicarbazone of the formula $RCH=NNHCONH_2$ with thioglycolic acid.

7. The process of preparing a compound having the formula

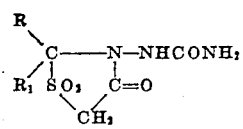

where R and $R_1$ are each lower alkyl radicals, which comprises oxidizing a 4-thiazolidone having the formula

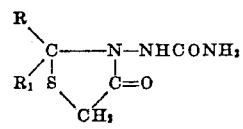

8. The process of preparing a compound having the formula

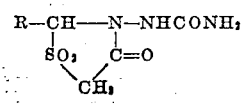

where R is a monocarbocyclic aryl radical, which comprises oxidizing a 4-thiazolidone having the formula

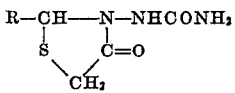

9. The process of preparing 2,2-dimethyl-3-ureido-4-thiazolidone which comprises heating acetone semicarbazone with thioglycolic acid.

10. The process of preparing 2-n-propyl-3-ureido-4-thiazolidone which comprises heating n-butyraldehyde semicarbazone with thioglycolic acid.

11. The process of preparing 2-(4-chlorophenyl) - 3 - ureido - 4 - thiazolidone which comprises heating 4-chlorobenzaldehyde semicarbazone with thioglycolic acid.

12. The process of preparing 2,2-dimethyl-3-ureido-4-thiazolidone-1-dioxide which comprises oxidizing 2,2-dimethyl-3-ureido-4-thiazolidone.

13. The process of preparing 2-(4-chlorophenyl)-3-ureido-4-thiazolidone-1-dioxide which comprises oxidizing 2-(4-chlorophenyl)-3-ureido-4-thiazolidone.

ALEXANDER R. SURREY.

References Cited in the file of this patent

UNITED STATES PATENTS

| Number | Name | Date |
|---|---|---|
| 2,520,178 | Surrey | Aug. 29, 1950 |
| 2,520,179 | Surrey | Aug. 29, 1950 |